US012264840B2

(12) United States Patent
Silva et al.

(10) Patent No.: US 12,264,840 B2
(45) Date of Patent: Apr. 1, 2025

(54) COIL CLEANING EASY ACCESS

(71) Applicant: Carrier Corporation, Palm Beach Gardens, FL (US)

(72) Inventors: Frank Silva, Huntersville, NC (US); Thomas Franaszek, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 233 days.

(21) Appl. No.: 17/305,181

(22) Filed: Jul. 1, 2021

(65) Prior Publication Data

US 2022/0011010 A1 Jan. 13, 2022

Related U.S. Application Data

(60) Provisional application No. 62/705,603, filed on Jul. 7, 2020.

(51) Int. Cl.
*F24F 13/20* (2006.01)
*B08B 3/02* (2006.01)
(Continued)

(52) U.S. Cl.
CPC .............. *F24F 13/20* (2013.01); *F24F 13/30* (2013.01); *B08B 3/02* (2013.01); *B08B 9/023* (2013.01);
(Continued)

(58) Field of Classification Search
CPC ........ F24F 13/20; F24F 13/30; F24F 2221/16; F24F 2221/225; F24F 1/50; F24F 1/56; F24F 13/029; F24F 1/16; F24F 1/0063
See application file for complete search history.

(56) References Cited

U.S. PATENT DOCUMENTS 5,140,830 A * 8/1992 Sawyer .................. F24F 1/022 62/298
5,170,550 A 12/1992 Cox
(Continued)

FOREIGN PATENT DOCUMENTS

EP 2402665 A1 1/2012
EP 3640973 A1 4/2020
EP 3643973 A1 4/2020

OTHER PUBLICATIONS

Extended European Search Report received for EP Application No. 21181830.7, mailed on Feb. 12, 2021, 7 Pages.

*Primary Examiner* — Kun Kai Ma
(74) *Attorney, Agent, or Firm* — Souad Hakim

(57) ABSTRACT

An access panel assembly and a heating, ventilation, and/or air conditioning (HVAC) system incorporating the access panel assembly are provided. The HVAC system includes a heat exchanger assembly with a first heat exchanger coil and a second heat exchanger coil (e.g., in a V-shaped configuration). The first heat exchanger coil and the second heat exchanger coil each respectively include an exterior surface, an interior surface, a first edge, and a second edge. The access panel assembly is adjacent to the first edge of the first heat exchanger coil and the first edge of the second heat exchanger coil. The access panel assembly is configured to provide access (e.g., for cleaning and/or maintenance) to at least one of: the interior surface of the first heat exchanger coil and the interior surface of the second heat exchanger coil.

16 Claims, 4 Drawing Sheets

(51) Int. Cl.
*B08B 9/023* (2006.01)
*F24F 13/30* (2006.01)

(52) U.S. Cl.
CPC ..... *F24F 2221/16* (2013.01); *F24F 2221/225* (2013.01)

(56) References Cited

U.S. PATENT DOCUMENTS

| | | | | | |
|---|---|---|---|---|---|
| 5,260,523 | A * | 11/1993 | Pettersson | F16L 55/02754 181/252 |
| 9,127,867 | B2 * | 9/2015 | Tanno | F25B 13/00 |
| 9,335,098 | B2 * | 5/2016 | Pawlick | F28D 1/024 |
| 10,520,235 | B2 * | 12/2019 | Mackey | F24F 1/38 |
| 10,619,901 | B2 * | 4/2020 | Mast | F28F 1/022 |
| 11,306,970 | B2 * | 4/2022 | Klaba | F28B 1/06 |
| 11,454,420 | B2 * | 9/2022 | Hoyt | F24F 13/30 |
| 2008/0076343 | A1 * | 3/2008 | Pyers | H01L 21/67724 454/141 |
| 2008/0148746 | A1 | 6/2008 | Yanik | |
| 2010/0162739 | A1 * | 7/2010 | Kopko | F24F 1/50 62/115 |
| 2012/0194041 | A1 * | 8/2012 | Hika | F24F 1/46 312/100 |
| 2012/0195000 | A1 * | 8/2012 | Hika | F24F 1/46 361/692 |
| 2017/0130974 | A1 | 5/2017 | Mercer et al. | |
| 2018/0080667 | A1 * | 3/2018 | Nishimoto | F28D 1/0475 |
| 2022/0404072 | A1 * | 12/2022 | Trevisan | F25B 40/02 |

* cited by examiner

COIL CLEANING EASY ACCESS

CROSS REFERENCE TO A RELATED APPLICATION

The application claims the benefit of U.S. Provisional Application No. 62/705,603 filed Jul. 7, 2020, the contents of which are hereby incorporated in their entirety.

BACKGROUND

The invention relates to heating, ventilation, and/or air conditioning (HVAC) systems. More particularly, the invention relates to the use of an access panel assembly for providing access to an interior surface of a heat exchanger assembly (e.g., of an air-cooled chiller or condensing unit).

Air-cooled chillers are typically located on the exterior of a building (e.g., on the rooftop). Air-cooled chillers are often used by commercial buildings that require large heating and cooling capacity. These air-cooled chillers commonly include multiple heat exchanger coils and multiple fans for circulating air over the heat exchanger coils. More commonly the heat exchanger coils are configured in a V-shaped coil arrangement. This configuration allows air to enter through either side of the V-shaped arrangement, passing through one of the legs of the V, and exiting in an upward direction. With the air-cooled chiller relying on heat transfer through the coils, it is important for the coils to remain relatively clean in order to operate at maximum efficiency. Due to the typical location of the air-cooled chiller being outside of the building, regular maintenance is needed in order to keep the heat exchanger coils free of debris (e.g., dirt, etc.). How often the exchanger coils need to be cleaned may be dependent at least in part on the surrounding environment (e.g., more cleaning may be needed in areas with higher amounts of dust particles).

Most commonly, the heat exchanger coils are cleaned by spraying water toward the exterior surface of the heat exchanger coils. However, this cleaning method pushes debris toward the interior portion of the V-shaped arrangement. Due to the conventional way in which the air-cooled chillers are manufactured (e.g., where sheet metal is fixed between the V-shaped arrangement) the interior portion of the V-shaped arrangement is hard to access, and, as such, is rarely cleaned. To clean the interior portion of the V-shaped arrangement for conventional air-cooled chillers maintenance personnel may be forced to either disassemble the V-shaped arrangement or climb on top of the air-cooled chiller to spray water through the fan on the top of the air-cooled chiller. However, neither of these cleaning methods are ideal. Disassembling the V-shaped arrangement can be a very time-consuming process, and there is potential that the heat exchanger coils could become damaged in the process. Climbing on top of the air-cooled chiller is also not ideal as the air-cooled chillers are relatively tall (e.g., approximately 10 feet tall), which can present safety issues.

Accordingly, there remains a need for a more accessible way to access the interior surface of the heat exchanger coils that enables the interior surface of the heat exchanger coils to be regularly cleaned and maintained.

BRIEF DESCRIPTION

According to one embodiment, a heating, ventilation, and/or air conditioning (HVAC) system including a heat exchanger assembly and an access panel assembly is provided. The heat exchanger assembly includes a first heat exchanger coil and a second heat exchanger coil. The first heat exchanger coil and the second heat exchanger coil each respectively include an exterior surface, an interior surface, a first edge, and a second edge. The access panel assembly is disposed adjacent to the first edge of the first heat exchanger coil and the first edge of the second heat exchanger coil. The access panel assembly is configured to provide access to at least one of: the interior surface of the first heat exchanger coil and the interior surface of the second heat exchanger coil.

In accordance with additional or alternative embodiments, the heat exchanger assembly has a V-shaped configuration.

In accordance with additional or alternative embodiments, the heat exchanger assembly includes a mounting surface attached to at least one of: the first edge and the second edge.

In accordance with additional or alternative embodiments, the access panel assembly is operably coupled to the mounting surface with at least one fastener.

In accordance with additional or alternative embodiments, the access panel assembly is operably coupled to the mounting surface with at least one of: a hinge and a latch.

In accordance with additional or alternative embodiments, the access panel assembly includes a handle disposed thereon.

In accordance with additional or alternative embodiments, the access panel assembly has a V-shaped configuration.

In accordance with additional or alternative embodiments, the HVAC system further includes an additional access panel assembly disposed adjacent to the second edge of the first heat exchanger coil and the second edge of the second heat exchanger coil, the additional access panel assembly configured to provide access to at least one of: the interior surface of the first heat exchanger coil and the interior surface of the second heat exchanger coil.

In accordance with additional or alternative embodiments, the HVAC system further includes a fan assembly with a blade housing and a motor, the blade housing vertically adjacent to an upper edge of the first heat exchanger coil and an upper edge of the second heat exchanger coil, the motor disposed in a space between the interior surface of the first heat exchanger coil and the interior surface of the second heat exchanger coil.

In accordance with additional or alternative embodiments, the access panel assembly is configured to provide access to the motor.

In accordance with additional or alternative embodiments, the HVAC system includes at least two heat exchanger assemblies and at least two access panel assemblies.

In accordance with additional or alternative embodiments, the HVAC system is an air-cooled chiller.

According to another aspect of the disclosure, an access panel assembly for providing access to an interior surface of a heat exchanger assembly is provided. The access panel assembly includes an access panel surface and at least one fastener aperture disposed in the access panel surface. The access panel surface includes a first side and a second side. The second side is operably coupled to a mounting surface of the heat exchanger assembly. The at least one fastener aperture is configured to receive a fastener. The fastener is configured to removably attach the access panel assembly to the mounting surface.

In accordance with additional or alternative embodiments, the first side comprises a handle disposed thereon.

In accordance with additional or alternative embodiments, the first side includes a recessed section and a protruding section.

In accordance with additional or alternative embodiments, the recessed section is configured to be coplanar with the mounting surface when the access panel assembly is attached to the mounting surface.

In accordance with additional or alternative embodiments, the at least one fastener aperture is disposed in the protruding section.

In accordance with additional or alternative embodiments, the heat exchanger assembly has a V-shaped configuration.

In accordance with additional or alternative embodiments, the mounting surface has a V-shaped configuration.

In accordance with additional or alternative embodiments, the access panel assembly has a V-shaped configuration.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

An access panel assembly and a heating, ventilation, and/or air conditioning (HVAC) system including a heat exchanger assembly and an access panel assembly are provided. The heat exchanger assembly includes a first heat exchanger coil and a second heat exchanger coil. The access panel is disposed adjacent to a first edge of the first heat exchanger coil and a first edge the second heat exchanger coil. Alternatively, the access panel is disposed adjacent to a second edge of the first heat exchanger coil and a second edge the second heat exchanger coil. It will be appreciated that the access panel may be position in either or both locations as described above. Due to the configuration (e.g., by being in a V-shaped arrangement) of the heat exchanger coil, the interior surface of at least one the first heat exchanger coil and the second heat exchanger coil may be difficult to access without inclusion of the access panel assembly. By including an access panel assembly, the HVAC system can be more easily maintained, which may result in a higher efficiency over the life of the HVAC system. This increase in efficiency may be attributable, at least in part, to the access panel assembly providing an easier (e.g., compared to traditional HVAC systems) way to access the interior surface of the heat exchanger coils so that the interior surface of the heat exchanger coils can be regularly cleaned and maintained (e.g., to remove debris such as dust from within the coil).

Figure 1:
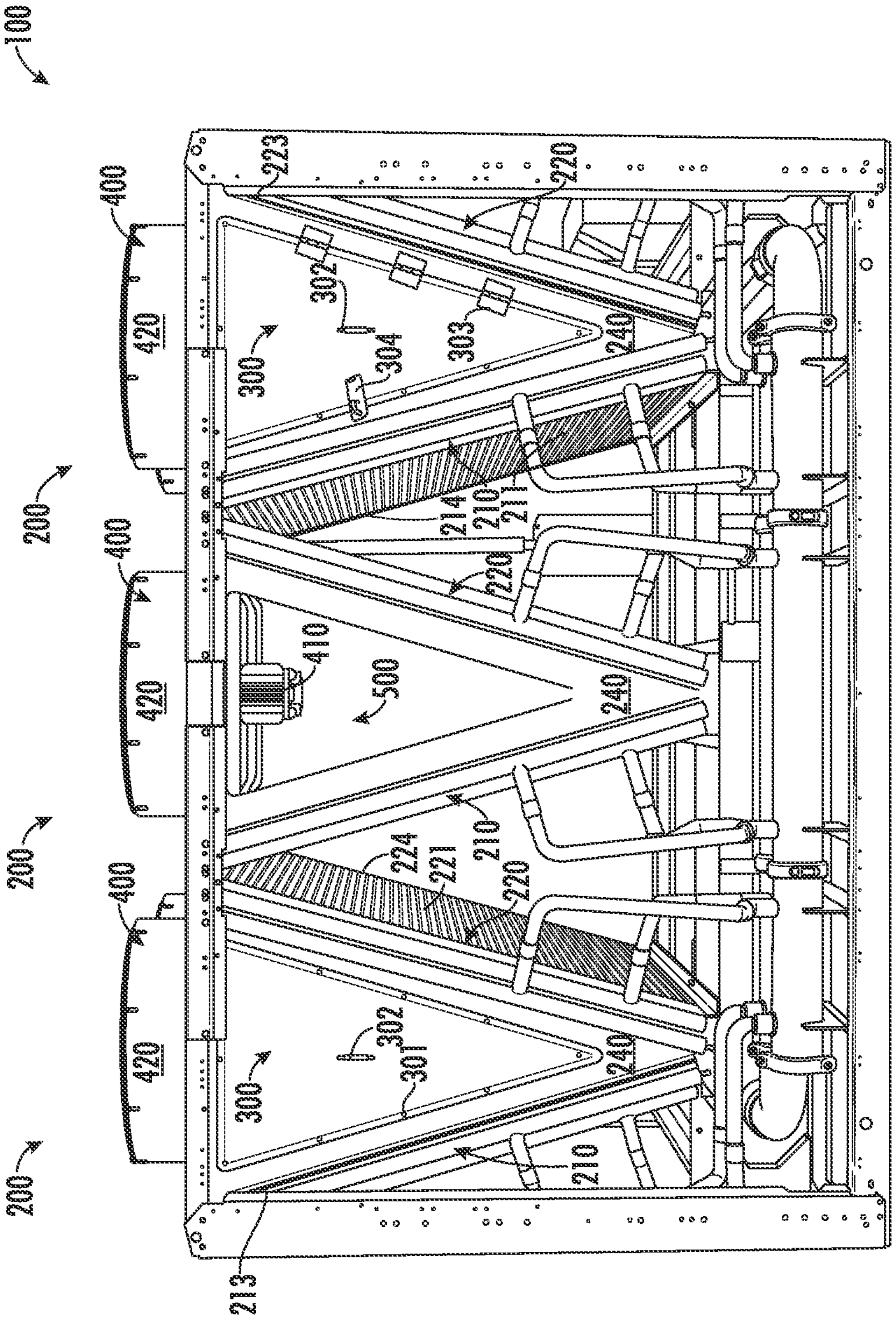
FIG. 1 is a perspective view of a heating, ventilation, and/or air conditioning (HVAC) system including a heat exchanger assembly and an access panel assembly, in accordance with one aspect of the disclosure.

With reference now to the Figures, an exemplary HVAC system 100, in accordance with various aspects of the disclosure, is shown in FIG. 1. As shown in FIG. 1, the HVAC system 100 includes a heat exchanger assembly 200 and an access panel assembly 300. As shown in FIG. 1, in certain instances, the HVAC system 100 may be embodied as an air-cooled chiller (e.g., which may include multiple heat exchanger assemblies 200 and/or multiple access panel assemblies 300). However, it should be appreciated that the HVAC system 100 should not be limited to being embodied as an air-cooled chiller (e.g., the HVAC system 100 may be embodied as a condensing unit). It is envisioned the HVAC system 100 may be embodied as any HVAC system 100 with a heat exchanger assembly 200 and an access panel assembly 300.

The heat exchanger assembly 200 includes a first heat exchanger coil 210 and a second heat exchanger coil 220. The first heat exchanger coil 210 includes an exterior surface 211 (shown in FIG. 1), an interior surface 212 (shown in FIG. 2), a first edge 213 (shown in FIG. 1), and a second edge 214 (shown in FIG. 1). The second heat exchanger 220 includes an exterior surface 221 (shown in FIG. 1), an interior surface 222 (shown in FIG. 3), a first edge 223 (shown in FIG. 1), and a second edge 224 (shown in FIG. 1). It should be appreciated that the first heat exchanger coil 210 and the second heat exchanger 220 may be any type of coil (e.g., microchannel, etc.) capable of transferring heat from an external fluid medium (e.g., air, water, etc.) to or from a working fluid (e.g., water, refrigerant, etc.).

The access panel assembly 300 is disposed adjacent to the first edge 213 of the first heat exchanger coil 210 and the first edge 223 of the second heat exchanger coil 220. The access panel assembly 300 is configured to provide access to at least one of: the interior surface 212 of the first heat exchanger coil 210 and the interior surface 222 of the second heat exchanger coil 220. For example, by removing or opening the access panel assembly 300 the interior surface(s) 212, 222 may be cleaned (e.g., by spraying water directly toward the interior surface(s) 212, 222). By allowing the heat exchanger coils 210, 220 to be cleaned from the inside (instead of from the outside, as is done conventionally) debris may be forced outward, away from the inside of the heat exchanger assembly 200 (instead of inward, toward the inside of the heat exchanger assembly 200, as is done conventionally).

As shown in FIGS. 1-4, the heat exchanger assembly 200 may be configured in a V-shaped arrangement, where the first heat exchanger coil 210 forms one leg of the "V" and the second heat exchanger coil 220 forms the other leg of the "V". This V-shaped arrangement is traditionally difficult to clean and maintain due to the solid structure (e.g., sheet metal) traditionally used to cover the V-shaped arrangement. However, the HVAC system 100 described herein, by providing an access panel assembly 300 that is capable of being removed or opened in a relatively simple fashion, makes it easier to clean the V-shaped arrangement. By reducing the difficultly of cleaning and maintaining the V-shaped arrangement, a more thorough cleaning may be achievable (e.g., a higher percentage of debris may be removed from inside the V-shaped arrangement by utilizing an access panel assembly 300).

To attach the access panel assembly 300 to the heat exchanger assembly 200 a mounting surface 240 may be provided. For example, as shown in FIG. 1, the heat exchanger assembly 200 may include a mounting surface 240 attached (e.g., using one or more fasteners or through welding) to at least one of: the first heat exchanger coil 210 and the second heat exchanger coil 220. It is envisioned, that this mounting surface 240 may be provided as a piece of sheet metal configured within the V-shaped arrangement of the heat exchanger assembly 200. In certain instances, the mounting surface 240 is configured in a V-shaped arrangement. However, it should be appreciated that the mounting may be configured in any suitable arrangement that allows the access panel assembly 300 to be opened or removed (e.g., to provide access to the interior surface(s) 212, 222).

As shown in FIG. 1, in certain instances, the access panel assembly 300 is operably coupled to the mounting surface with at least one fastener 301 (e.g., a screw, bolt, pin, etc.). For example, by using at least one fastener 301 the access panel assembly 300 may be able to be removed (e.g., by taking out the fastener(s) 301) to provide access to the interior surface(s) 212, 222. However, as shown in FIG. 1, the access panel assembly 300 may be operably coupled to the mounting surface with at least one of: a hinge 303 and a latch 304. For example, by using a hinge 303 the access panel assembly 300 may be able to be opened (e.g., like a door) to provide access to the interior surface(s) 212, 222. To make it easier to open or remove the access panel assembly 300, the access panel assembly 300 may include a handle 302.

The access panel assembly 300 is designed to increase the accessibility to the interior surfaces 212, 222 of the heat exchanger coils 210, 220 so that the heat exchanger coils 210, 220 can be regularly cleaned and maintained. In certain instances, the access panel assembly 300 is designed with a specific configuration to maximize the opening between the heat exchanger coils 210, 220. For example, the access panel assembly 300 may be configured in a V-shaped arrangement (as shown in FIGS. 1-4). However, it should be appreciated that the access panel assembly 300 may be configured in any arrangement (e.g., square, trapezoid, etc.) that provides access to the interior surface(s) 212, 222.

It is envisioned that the HVAC system 100 may include multiple access panel assemblies 300. For example, the HVAC system 100 may include an additional access panel assembly 300 disposed adjacent to the second edge 214 of the first heat exchanger coil 210 and the second edge 224 of the second heat exchanger coil 220 to provide access to at least one of: the interior surface 212 of the first heat exchanger coil 210 and the interior surface 222 of the second heat exchanger coil 220. This additional access panel assembly 300 may allow either or both sides of the heat exchanger assembly 200 to be opened (by removing or opening the additional access panel assembly 300), which may increase the overall accessibility of the HVAC system 100. For example, including access panel assemblies 300 on both sides of the heat exchanger assembly 200 may reduce (e.g., by half) how far maintenance personnel have to reach inside the HVAC system 100 when cleaning/maintaining the HVAC system 100.

Figure 2:
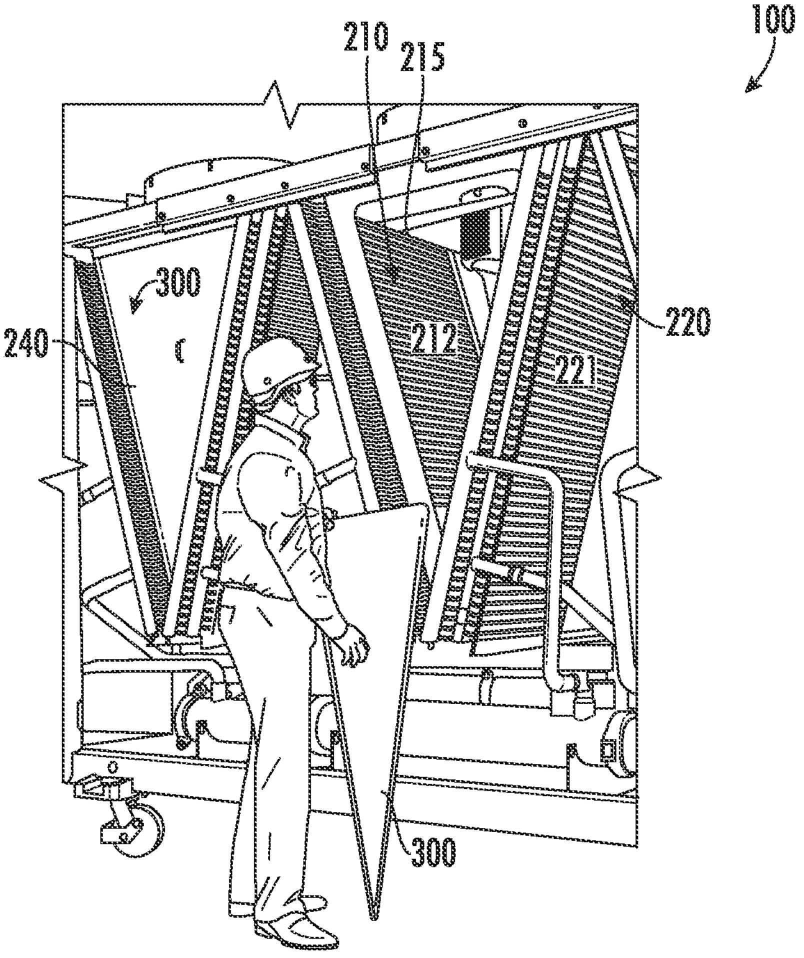
FIG. 2 is a perspective view of an interior surface of the heat exchanger assembly shown in FIG. 1, in accordance with one aspect of the disclosure.
Figure 3:
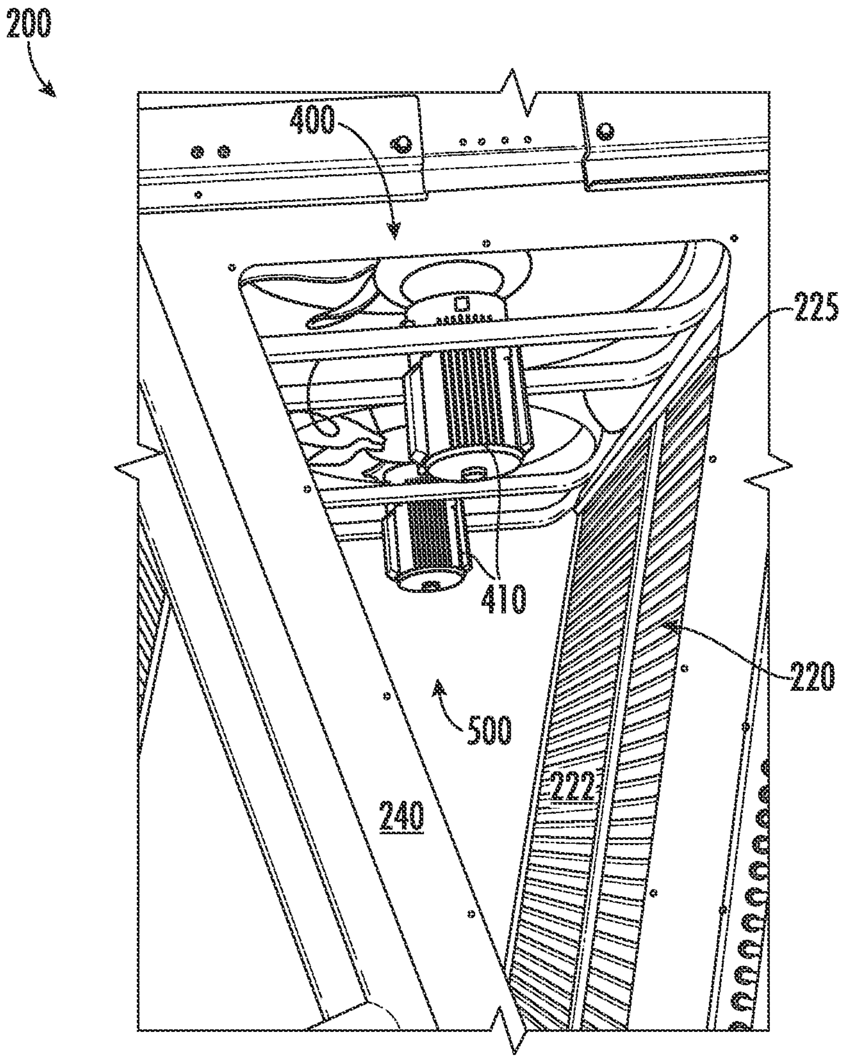
FIG. 3 is a perspective view of a fan assembly vertically adjacent to the upper edges of the heat exchanger assembly shown in FIG. 1, in accordance with one aspect of the disclosure.

In addition to increasing the accessibility to the interior surfaces 212, 222 of the heat exchanger assembly 200, the access panel assembly 300 may also provide easier access to a fan motor 410 disposed within the HVAC system 100 (e.g., disposed in a space 500 between the interior surface 212 of the first heat exchanger coil 210 and the interior surface 222 of the second heat exchanger coil 220). This fan motor 410 may be one component of a fan assembly 400. For example, the fan assembly 400 may also include a blade housing 420 (shown in FIG. 1). As shown in FIGS. 1-3, in certain instances, the HVAC system 100 includes a fan assembly 400 including a blade housing 420 disposed vertically adjacent to an upper edge 215 of the first heat exchanger coil 210 and an upper edge 225 of the second heat exchanger coil 220 (e.g., mounted to the top of the upper edges 215, 225 and spanning the space 500 between the first heat exchanger coil 210 and the second heat exchanger coil 220). This fan assembly 400 may be used to draw air through the heat exchanger assembly 200 so as to transfer heat either to or from working fluid (e.g., water, refrigerant, etc.) circulating through the heat exchanger assembly 200.

Figure 4:
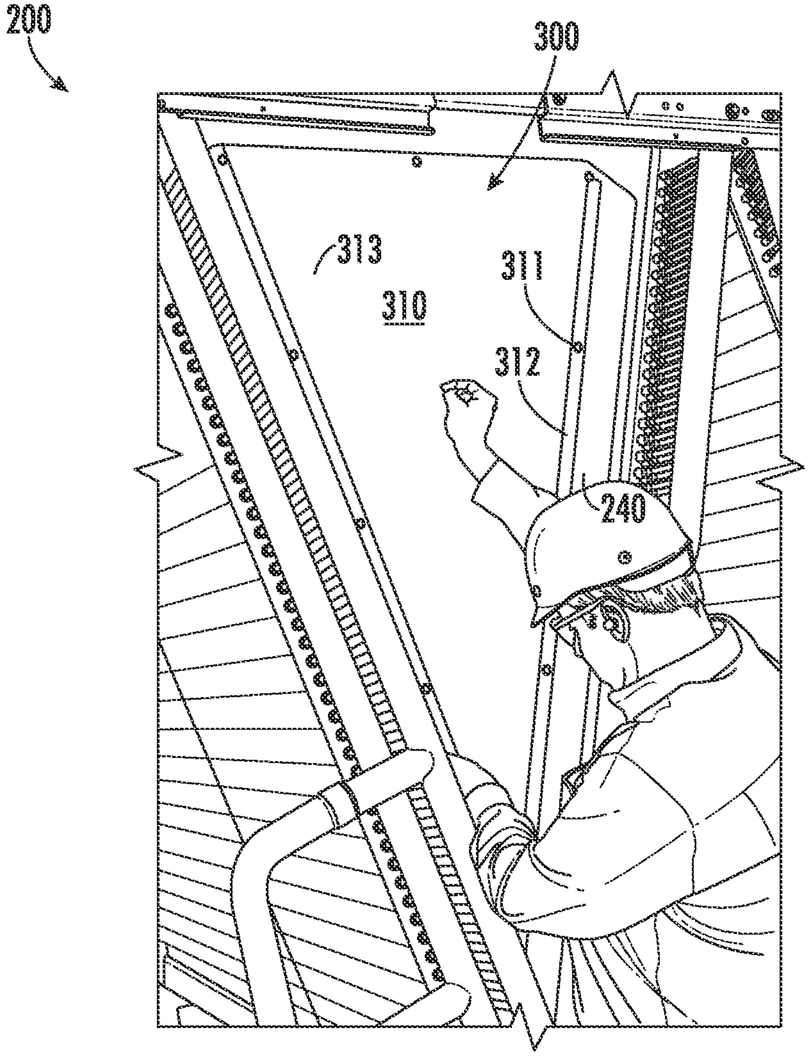
FIG. 4 is a perspective view of an access panel assembly adjacent to a heat exchanger assembly, in accordance with one aspect of the disclosure.

As described above, the access panel assembly 300 may be used to increase the accessibility to an interior surface 212, 222 of a heat exchanger assembly 200. This increase in accessibility may be attributable to the specific design and configuration of the access panel assembly 300. For example, as mentioned above, the access panel assembly 300 may be designed to have the same configuration as the mounting surface 240 and/or the heat exchanger assembly 200, which may maximize the opening between the heat exchanger coils 210, 220. As shown in FIG. 4, the access panel assembly includes an access panel surface 310 which has a first side (directed toward the exterior of the heat exchanger assembly 200 when the access panel assembly 300 is installed/closed) and a second side (directed toward the interior of the heat exchanger assembly 200 when the access panel assembly 300 is installed/closed). The second side may be operably coupled to a mounting surface 240 of the heat exchanger assembly 200 (e.g., to allow the access panel assembly 300 to be opened/removed from the heat exchanger assembly 200). To removably attach the access panel assembly 300 to the mounting surface 240, at least one fastener aperture 311 may be disposed in the access panel assembly surface 310. The at least one fastener aperture 311 is configured to receive a fastener 312 (e.g., a screw, bolt, pin, etc.).

In certain instances, the access panel assembly 300 is designed to tightly fit between the first heat exchanger coil 210 and the second heat exchanger coil 220 so as to prevent, or at least mitigate debris, such as dust, from entering around the access panel assembly 300. To reduce any gap between the access panel assembly 300 and the mounting surface 240, the first side of the access panel surface 310 may include a recessed section 313 and a protruding section 311. This recessed section 313 may be sized to fill the opening within the mounting surface 240. For example, the recessed section 313 may be configured to be substantially coplanar (on approximately the same plane) with the mounting surface 240 when the access panel assembly 300 is attached to the mounting surface 240. The protruding section 311 may be designed to overlap at least a portion of the mounting surface 240 to create a seal when fastened. For example, the fasteners may be passed through the fastener apertures (e.g., disposed in the protruding section 311) and through the mounting surface 240, which may create a seal between the access panel assembly 300 and the mounting surface 240. This overlap may prevent, or at least mitigate debris from entering around the access panel assembly 300, which may reduce the frequency in which the HVAC system 100 needs to be cleaned and/or maintained.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heating, ventilation, and/or air conditioning (HVAC) system, comprising:

a heat exchanger assembly comprising a first heat exchanger coil and a second heat exchanger coil, the first heat exchanger coil and the second heat exchanger coil each respectively comprising an exterior surface, an interior surface, a first edge, and a second edge; and an access panel assembly disposed adjacent to the first edge of the first heat exchanger coil and the first edge of the second heat exchanger coil, the access panel assembly configured to provide access to at least one of: the interior surface of the first heat exchanger coil and the interior surface of the second heat exchanger coil, wherein the heat exchanger assembly for the HVAC system comprises a V-shaped configuration, wherein:

the access panel assembly is configured to be removably attached to a mounting surface of the heat exchanger assembly;

the access panel assembly comprises an access panel surface having a first side and a second side, wherein the first side comprises a recessed section and a protruding section; and the recessed section is configured to be coplanar with the mounting surface when the access panel assembly is attached to the mounting surface.

2. The HVAC system of claim 1, wherein the heat exchanger assembly comprises the mounting surface attached to at least one of: the first edge and the second edge.

3. The HVAC system of claim 2, wherein the access panel assembly is operably coupled to the mounting surface with at least one fastener.

4. The HVAC system of claim 2, wherein the access panel assembly is operably coupled to the mounting surface with at least one of: a hinge and a latch.

5. The HVAC system of claim 1, wherein the access panel assembly comprises a handle disposed thereon.

6. The HVAC system of claim 1, wherein the access panel assembly comprises a V-shaped configuration.

7. The HVAC system of claim 1, further comprising an additional access panel assembly disposed adjacent to the second edge of the first heat exchanger coil and the second edge of the second heat exchanger coil, the additional access panel assembly configured to provide access to at least one of: the interior surface of the first heat exchanger coil and the interior surface of the second heat exchanger coil.

8. The HVAC system of claim 1, further comprising a fan assembly comprising a blade housing and a motor, the blade housing vertically adjacent to an upper edge of the first heat exchanger coil and an upper edge of the second heat exchanger coil, the motor disposed in a space between the interior surface of the first heat exchanger coil and the interior surface of the second heat exchanger coil.

9. The HVAC system of claim 8, wherein the access panel assembly is configured to provide access to the motor.

10. The HVAC system of claim 1, wherein the HVAC system comprises at least two heat exchanger assemblies and at least two access panel assemblies.

11. The HVAC system of claim 1, wherein the HVAC system is an air-cooled chiller.

12. An access panel assembly for providing access to an interior surface of a heat exchanger assembly, the access panel assembly comprising:

an access panel surface comprising a first side and a second side, the second side operably coupled to a mounting surface of the heat exchanger assembly, wherein the heat exchanger assembly comprises a V-shaped configuration, wherein the first side comprises a recessed section and a protruding section, and wherein the recessed section is configured to be coplanar with the mounting surface when the access panel assembly is attached to the mounting surface; and at least one fastener aperture disposed in the access panel surface, the at least one fastener aperture configured to receive a fastener, the fastener configured to removably attach the access panel assembly to the mounting surface.

13. The access panel assembly of claim 12, wherein the first side comprises a handle disposed thereon.

14. The access panel assembly of claim 12, wherein the protruding section is configured to overlap at least a portion of the mounting surface when the access panel assembly is attached to the mounting surface, and wherein the at least one fastener aperture is disposed in the protruding section.

15. The access panel assembly of claim 12, wherein the mounting surface comprises a V-shaped configuration.

16. The access panel assembly of claim 12, wherein the access panel assembly comprises a V-shaped configuration.

* * * * *